United States Patent
Zhang et al.

(10) Patent No.: US 8,144,631 B2
(45) Date of Patent: Mar. 27, 2012

(54) INTERCONNECTING IP VIDEO ENDPOINTS WITH REDUCED H.320 CALL SETUP TIME

(75) Inventors: Yu Zhang, Santa Clara, CA (US); Mark J. Conner, Boulder Creek, CA (US); Sabita Jasty, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1469 days.

(21) Appl. No.: 11/639,078

(22) Filed: Dec. 13, 2006

(65) Prior Publication Data

US 2008/0143816 A1    Jun. 19, 2008

(51) Int. Cl.
*H04L 12/66*  (2006.01)

(52) U.S. Cl. ........ 370/261; 370/264; 370/352; 370/503; 709/227; 709/248; 709/249

(58) Field of Classification Search .................. None
See application file for complete search history.

(56) References Cited

U.S. PATENT DOCUMENTS

| | | | |
|---|---|---|---|
| 4,684,872 A | 8/1987 | Stewart | |
| 5,820,463 A | 10/1998 | O'Callaghan | |
| 5,953,049 A | 9/1999 | Horn et al. | |
| 6,016,430 A | 1/2000 | Shinomiya | |
| 6,044,081 A | 3/2000 | Bell et al. | |
| 6,253,270 B1 | 6/2001 | Ajanovic et al. | |
| 6,275,889 B1 | 8/2001 | Saito | |
| 6,545,979 B1 | 4/2003 | Poulin | |
| 6,560,201 B1 * | 5/2003 | Amann et al. | 370/242 |
| 6,590,867 B1 | 7/2003 | Ashet et al. | |
| 6,628,608 B1 | 9/2003 | Lau et al. | |
| 6,771,644 B1 | 8/2004 | Brassil et al. | |
| 6,876,632 B1 | 4/2005 | Takeda | |
| 6,947,417 B2 | 9/2005 | Laursen et al. | |
| 7,397,793 B2 * | 7/2008 | Urquizo et al. | 370/356 |
| 7,422,330 B2 | 9/2008 | Magarill | |

(Continued)

FOREIGN PATENT DOCUMENTS

EP    1 553 735 A1    7/2005
(Continued)

OTHER PUBLICATIONS

T Friedman et al., RFC 3611—RTP Control Protocol Extended reports, Nov. 2003, Abstract, Section 4.6 pp. 21-24 http://www.rfc-editor.org/rfc/rfc3611.txt.

(Continued)

*Primary Examiner* — Brian Roberts
(74) *Attorney, Agent, or Firm* — The Law Offices of Bradley J. Bereznak

(57) ABSTRACT

In one embodiment, a method includes sending, from an originating gateway device (OGW) to a terminating gateway device (TGW), a setup message for setting up a call on a primary bearer channel (B-channel) of an Integrated Services Digital Network (ISDN). The OGW interconnects with a first Internet Protocol (IP) video endpoint, and the TGW interconnects with a second IP video endpoint. In response to an alerting message sent from the TGW, the OGW initiates procedures for synchronizing a plurality of secondary B-channels between the OGW and the TGW prior to the call entering into a connect state. It is emphasized that this abstract is provided to comply with the rules requiring an abstract that will allow a searcher or other reader to quickly ascertain the subject matter of the technical disclosure.

24 Claims, 4 Drawing Sheets

U.S. PATENT DOCUMENTS

| | | |
|---|---|---|
| 7,449,395 B2 | 11/2008 | Allibert et al. |
| 7,561,527 B1 | 7/2009 | Katz et al. |
| 7,916,717 B2 * | 3/2011 | Morris ................. 370/354 |
| 2002/0014282 A1 | 2/2002 | Andersson et al. |
| 2002/0051464 A1 | 5/2002 | Sin et al. |
| 2002/0176404 A1 | 11/2002 | Girard |
| 2002/0186661 A1 | 12/2002 | Santiago et al. |
| 2003/0016627 A1 | 1/2003 | MeLampy et al. |
| 2003/0035384 A1 | 2/2003 | Cline et al. |
| 2003/0076850 A1 | 4/2003 | Jason, Jr. |
| 2003/0088671 A1 | 5/2003 | Klinker et al. |
| 2003/0163272 A1 | 8/2003 | Kaburlasos et al. |
| 2004/0052259 A1 | 3/2004 | Garcia et al. |
| 2004/0073641 A1 | 4/2004 | Minhazuddin |
| 2004/0073690 A1 | 4/2004 | Hepworth et al. |
| 2004/0078811 A1 | 4/2004 | Urdang |
| 2004/0196840 A1 | 10/2004 | Amrutur et al. |
| 2004/0213152 A1 | 10/2004 | Matuoka et al. |
| 2004/0252651 A1 * | 12/2004 | Karlsen et al. ............ 370/264 |
| 2005/0007959 A1 | 1/2005 | Tomonada et al. |
| 2005/0091190 A1 | 4/2005 | Klemets et al. |
| 2005/0219151 A1 | 10/2005 | Li et al. |
| 2005/0220081 A1 * | 10/2005 | Urquizo et al. ............ 370/352 |
| 2005/0243741 A1 * | 11/2005 | Flateby ................. 370/260 |
| 2006/0077891 A1 | 4/2006 | Smith et al. |
| 2006/0080662 A1 | 4/2006 | Mysore et al. |
| 2006/0291450 A1 | 12/2006 | Ramachandran et al. |
| 2007/0008896 A1 | 1/2007 | Green et al. |
| 2007/0121523 A1 | 5/2007 | Morandin |
| 2007/0192459 A1 | 8/2007 | Horimoto et al. |

FOREIGN PATENT DOCUMENTS

| | | |
|---|---|---|
| WO | WO 02/49316 | 6/2002 |

OTHER PUBLICATIONS

Schulzrinne et al., A Transport Protocol for Real-Time Applications, RFC 1889, RFC, Jan. 1996 http://www.ietf.org/rfc/rfc1889.txt.

M. Handley et al., RFC 4566—SDP: Session Description Protocol, Jul. 2006, pp. 1, 8, 9, 21, 22.

Manjunath Bangalore et al: "A Telephony Gateway Registration Protocol (TGREP); draft-ietf-iptel-tgrep-07.txt".

IETF Standart-Working-Draft, Internet Engineering Task Force, IETF, CH, vol. iptel, No. 7, Feb. 1, 2006, XP015043799, ISSN: 0000-0004.

* cited by examiner

INTERCONNECTING IP VIDEO ENDPOINTS WITH REDUCED H.320 CALL SETUP TIME

FIELD OF THE INVENTION

The present disclosure relates generally to the field of video communications over networks with interworking; that is, the mapping of call signaling messages between two different protocol suites.

BACKGROUND OF THE INVENTION

The communication pathway between two endpoint nodes or devices sometimes traverses networks that operate according to different protocol suites. For example, most modern video terminals are designed for connection with networks that utilize the well-known H.323 standard which specifies the components, protocols, and procedures that provide multimedia communication services—audio, video, and data communications—over packet networks, including Internet Protocol (IP)-based networks. But in certain cases the communication pathway between the IP endpoints may include a connection over an Integrated Services Digital Network (ISDN), which is an international communications standard for sending voice, video, and data over digital telephone lines. Video conferencing calls made over an ISDN normally utilize the H.320 protocol suite of recommendations, which is based on aggregated communication channels (e.g., so-called Bearer or "B" channels) with data throughput rates that are integer multiples of 64,000 bits per second (64 Kbps). A gateway device is typically used to inter-connect the two dissimilar networks.

When H.320 is used to inter-connect two IP video endpoints—e.g., a H.323, Session Initiation Protocol (SIP), or Skinny Client Control Protocol (SCCP) compatible endpoint device—multiple ISDN calls may be required to provide adequate bandwidth. In such cases, a primary call is placed to provide an in-band control message path via a H.221 along with bandwidth for audio and video payload. A number of secondary calls (e.g., B channels) are then established to provide additional bandwidth for the video and data payload. H.221 is part of the H.320 recommendations and defines a frame structure for audiovisual calls over single or multiple 64 Kbps channels; that is, how frames of audio, video, data, and control information are multiplexed and synchronized onto an ISDN channel. The problem with network architectures such as these, however, is that the call setup time may be exceedingly long depending on the establishment and synchronization of the H.221 FAS (Frame Alignment Signal) and BAS (Bit-rate Allocation Signal) channel. Also, it may take noticeable time for the video terminals to start displaying video once a call connection has been established, depending on when all the bearer channels synchronize to each other.

BRIEF DESCRIPTION OF THE DRAWINGS

The present invention will be understood more fully from the detailed description that follows and from the accompanying drawings, which however, should not be taken to limit the invention to the specific embodiments shown, but are for explanation and understanding only.

DETAILED DESCRIPTION

In the following description specific details are set forth, such as protocols, configurations, methods, etc., in order to provide a thorough understanding of the present invention. However, persons having ordinary skill in the relevant arts will appreciate that these specific details may not be needed to practice the present invention.

In the context of the present disclosure, a video terminal is defined as a client endpoint that provides real-time, two-way communications with another video terminal over one or more network connections. An endpoint is any device, component, element, or object capable of initiating or participating in audio/video packet-data exchanges over a network. An endpoint may comprise a personal computer (PCs), video IP phone, personal digital assistant (PDA), laptop or notebook computer, or other video conferencing equipment. A gateway comprises a node or network element that provides a translation function between an IP-compatible and a non-IP-compatible network. For instance, a gateway is a device that can connect and provide communications between H.323 conferencing endpoints over an ISDN call leg. Gateways perform translations between the different transmission formats and communication procedures, e.g., between H.323, H245, and H.225 associated with the IP video endpoints and the H.320, H.221 and Q.931 protocols associated with the ISDN call leg. (Q.931 is a signaling protocol that is involved in the setup and termination of connections over an ISDN used for communications from IP endpoints.) In addition, a gateway may support communications with, and translations between, endpoints and video terminals operating in accordance with different protocols. A gateway device may also be considered an endpoint or terminal in the context of the present invention.

According to one embodiment, a method for fast setup of video conference calls from one IP video endpoint to another IP video endpoint across an ISDN intermediary call leg is provided. The method reduces the H.320 call setup time and shortens the time needed to establish and synchronize the secondary call channels (e.g., B channels) by triggering the synchronization process—and thus the opening of the secondary call channels—in response to a call alerting signal sent from the called endpoint device across the gateways back toward the calling endpoint device. This synchronization process is initiated during the time that the called endpoint device rings, and prior to the time that the call actually connects, i.e., when the callee picks up the phone or otherwise answers the call.

Figure 1:
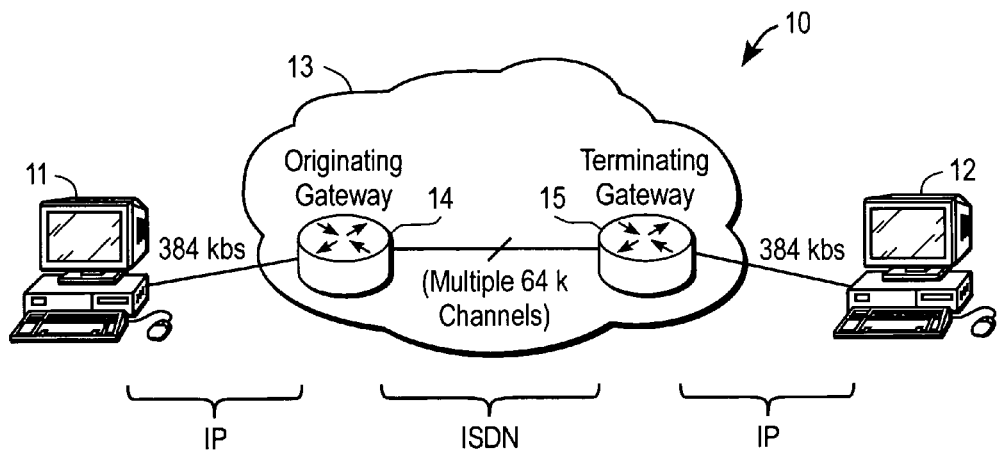
FIG. 1 illustrates an example communications network for video conferencing.
Figure 3:
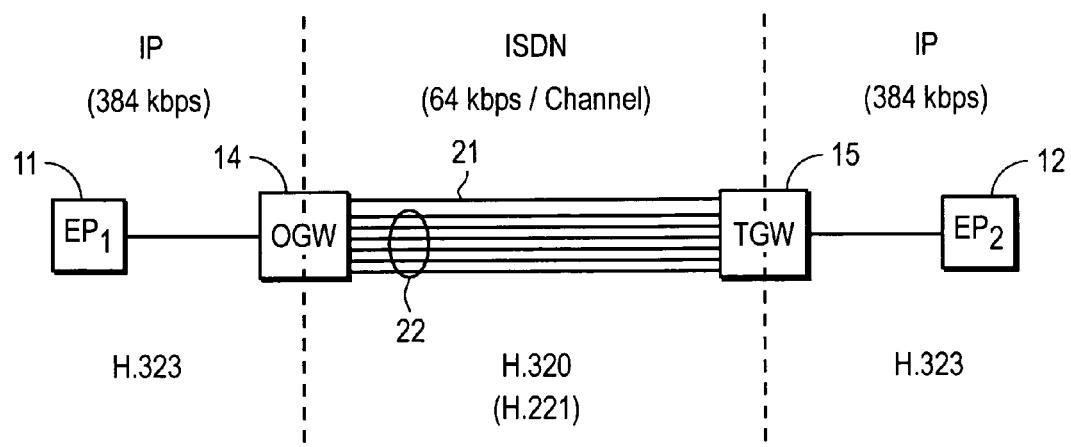
FIG. 3 illustrates an example wherein six secondary channels are utilized in a video conference call for the network shown in FIG. 1.

With reference now to FIG. 1, an example communications network 10 for video conferencing is shown comprising IP video endpoints (e.g., PCs) 11 & 12 connected over a network "cloud" 13 that includes gateway devices 14 & 15 that connect with each other over an ISDN. The video conferencing data transmitted between endpoints 11 & 12 is transmitted between gateways 14 & 15 over multiple 64 Kbps channels. FIG. 3 illustrates a specific example wherein six secondary channels 22 are utilized for data transmission in a video conference call from endpoint 11 to endpoint 12 for the network of FIG. 1. A single primary channel 21 is used to initiate call setup between endpoints 11 & 12 through originating gateway (OGW) device 14 and terminating gateway (TGW) device 15. In the examples of FIGS. 1 & 3, IP video endpoints 11 & 12 are shown operating at a data rate of 384 Kbps in accordance with the H.323 protocol. In contrast, communications between OGW 14 and TGW 15 are at 64 Kbps per channel in accordance with the H.320 protocol (also H.221 for frame structuring, Q.931 for connection setup, etc.).

Figure 2:
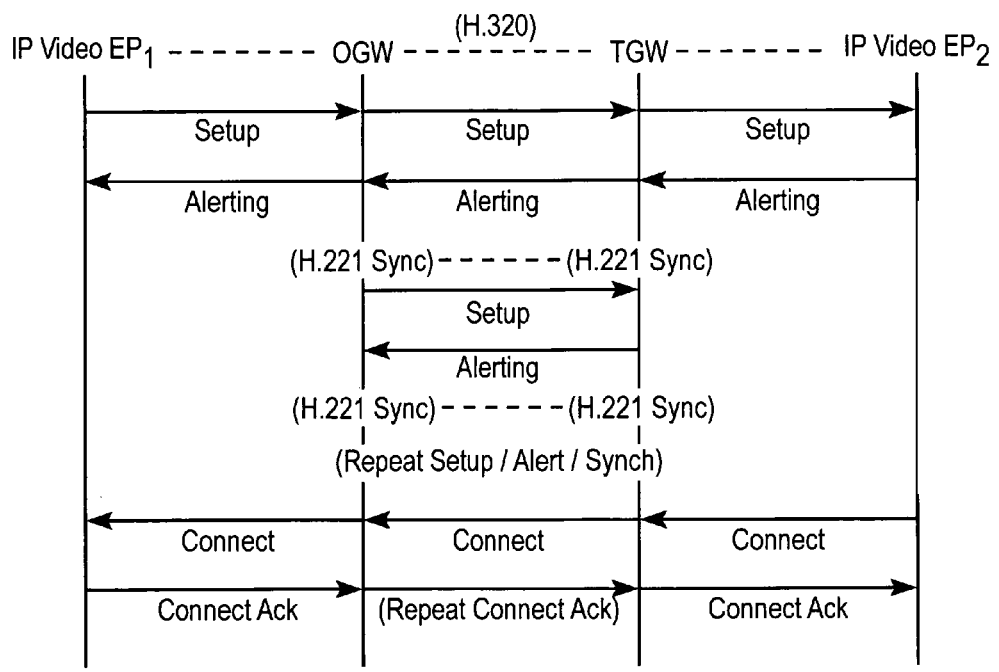
FIG. 2 illustrates an example call flow diagram for the network shown in FIG. 1.

FIG. 2 illustrates an example call flow diagram for the network shown in FIG. 1 for a call initiated by IP video endpoint 11 ($EP_1$) to IP video endpoint 12 ($EP_2$) via gateway connections across an ISDN. The video call flow begins with the OGW sending a SETUP message to the TGW. The TGW responds with an ALERTING message with a Progress Indicator number equal to eight (PI=8; in-band information or an appropriate pattern is now available). The PI=8 information element is utilized to signal the interworking H.320 and H.323 networks to trigger the cut-through of the bearer channel associated with the H.320 primary call. Cut-through is performed on the B-channels for FAS and BAS signals only. Actual audio and video media is still blocked in the forward direction to prevent fraudulent calls.

At this point, both the OGW and the TGW start the H.221 synchronization procedures on the initial or primary B-channel, which is sometimes referred to as the I-channel. In-band signaling occurs over the I-channel. The H.221 procedures include sending of the FAS and the BAS between the OGW and the TGW.

After H.221 synchronization has been achieved on the I-channel, the OGW starts the setup and synchronization procedures for the subsequent, secondary B-channels once the address information for the additional calls is available. According to H.221 protocol, audio can only exist in all or part of the I-channel, with the remaining bandwidth in this and subsequent B-channels being allocated for video and data. Note that the OGW initiates the additional calls to bring up the secondary B-channels without waiting for the primary call entering into the CONNECT state; that is, when the callee actually answers the ringing call. The address information for the additional calls can either be statically configured on the OGW, or passed from the TGW to the OGW via the established H.221 BAS channel.

It is appreciated that the H.221 synchronization procedures for setting up each of the subsequent calls may proceed sequentially. In other words, H.221 procedures may start on the next additional B-channel after it enters into an ALERTING state, which will synchronize that B-channel to the previously established B channel(s). By immediately synchronizing the secondary B-channels without waiting for the primary call to entering into the CONNECT state the call setups on all of the B-channels (the I-channel and the secondary B-channels) may finish prior to the time that the called IP video endpoint answers the call. To put it differently, most or all of the B-channels may have completed the synchronization process by the time that the callee answers the call, resulting in a CONNECT message sent back from the TGW to the OGW, followed by a CONNECT ACKNOWLEDGE back the other way. In this manner, the H320 call setup time is reduced and the sync time among the B-channels is shortened.

To the end user, the video media component of the conference call appears immediately or shortly after the call is answered. By way of example, in a laboratory environment in the case where the secondary numbers are configured to be dynamically passed between the gateways, a typical 384 Kbps (6 B) H.320 call takes around four seconds from the start of the H.320 primary call until all six B-channels are up and synchronized. In the case where the secondary numbers are statically configured on the OGW, that number drops to about 1.5 seconds. This means that if the callee takes two to four seconds to answer the call, video media will be transmitted between the endpoint devices substantially instantaneously (i.e., two seconds or less) upon entering the CONNECT state.

Note that in the event that the call is terminated on the video terminal phone that registers to the TGW, the ALERT message sent toward OGW will have PI=8. This ensures that the H.221 sync procedures can start early (before CONNECT). If the call is terminated on an H.323 endpoint routed to another gateway connected to the TGW, the ALERT message coming from H.323 endpoint or the third gateway may or may not have PI=8. If the ALERT from the H.323 endpoint or the gateway connected to TGW does not have PI=8, a PI=8 may nonetheless be set or included in the ALERT that is sent by TGW toward OGW.

Figure 4:
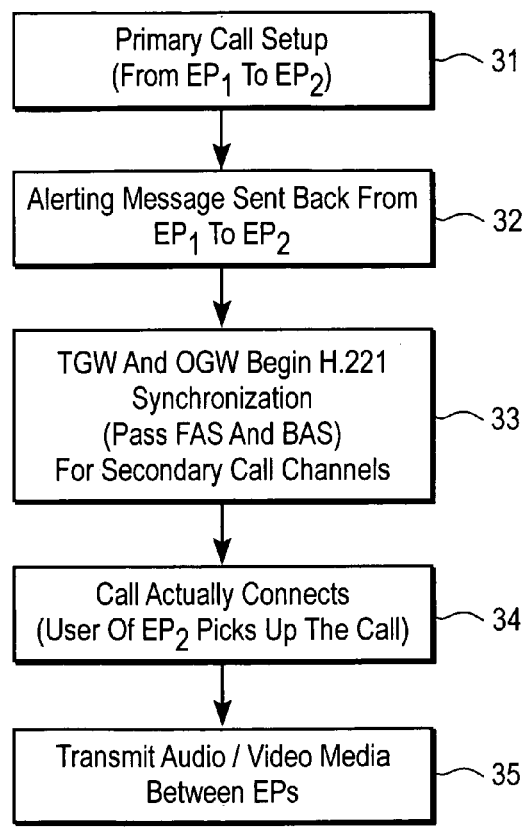
FIG. 4 illustrates an example method for establishing a video conference call between IP video endpoints shown in FIG. 1.

FIG. 4 illustrates an example method for establishing a video conference call between IP video endpoints over the network shown in FIG. 1. The process begins at block 31 with the sending of primary call SETUP message from a first endpoint device ($EP_1$) to a second endpoint device ($EP_2$). In response, an ALERT message with PI=8 is sent back from $EP_2$ to $EP_1$ (block 32). Voice path cut-through of the primary bearer channel (I-channel) is triggered when the ALERT with PI=8 passes the TGW. This results in the TGW and OGW devices starting H.221 synchronization procedures on the I-channel. Once the I-channel has been synchronized between the two gateways, the secondary call channels are established without waiting for a CONNECT message from $EP_2$. That is, the OGW starts the synchronization process needed to establish each of the secondary B-channels used for video/data transmissions. The synchronization process, which is shown in block 33, includes the exchange or passing of FAS and BAS information between the OGW and TGW.

At some point after some or all of the secondary B-channels have been established and synchronized, the user of $EP_2$ actually answers the call (block 34). Once CONNECT and CONNECT ACK messages have been sent across the gateways, audio/video media transmissions begin occurring (nearly instantly) between the EPs.

Figure 5:
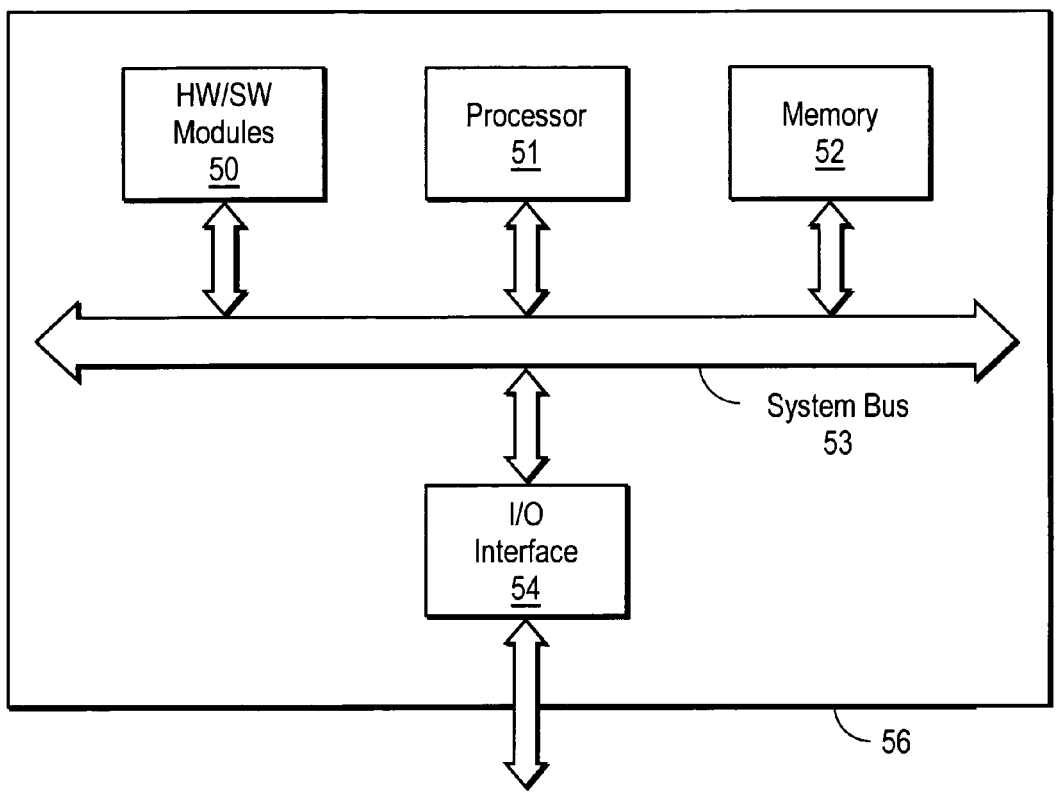
FIG. 5 illustrates an example network node.

FIG. 5 is a generalized block diagram showing an example network node 56, such as may comprise any of the devices or nodes shown or described in conjunction with FIG. 1 or 2. Node 56 includes a processor subsystem 51 coupled with a memory unit 52, one or more hardware/software modules 50, and an input/output (I/O) interface 54 via a system bus 53. Modules 50 may include software, firmware, or logic embedded in hardware for implementing any of the functions described herein, e.g., those functions associated with periodic generating and running test calls over WAN connections, acquiring voice quality information, and sending out appropriate notifications to initiate preventative actions.

It should be understood that elements of the present invention may also be provided as a computer program product which may include a "machine-readable medium" having stored thereon instructions which may be used to program a computer (e.g., a processor or other electronic device) to perform a sequence of operations. A machine-readable medium may include any computer program product, apparatus and/or device (e.g., magnetic discs, optical disks, memory, Programmable Logic Devices (PLDs) used to provide machine instructions and/or data to a programmable processor, including a machine-readable medium that receives machine instructions as a machine-readable signal. Alternatively, the operations may be performed by a combination of hardware and software. The machine-readable medium may include, but is not limited to, floppy diskettes, optical disks, CD-ROMs, and magneto-optical disks, ROMs, RAMs, EPROMs, EEPROMs, magnet or optical cards, or other type of machine-readable medium suitable for storing electronic instructions.

Furthermore, although the present invention has been described with reference to specific exemplary embodiments, it should be understood that numerous changes in the disclosed embodiments can be made in accordance with the disclosure herein without departing from the spirit and scope of the invention. The preceding description, therefore, is not meant to limit the scope of the invention. Rather, the scope of the invention is to be determined only by the appended claims and their equivalents.

We claim:

1. A method comprising:
   sending, from an originating gateway device (OGW) to a terminating gateway device (TGW), a setup message for setting up a call on a primary bearer channel (B-channel) of an Integrated Services Digital Network (ISDN), the OGW interconnecting with a first Internet Protocol (IP) video endpoint, and the TGW interconnecting with a second IP video endpoint;
   receiving, by the OGW, an alerting message sent from the TGW; and
   synchronizing a plurality of secondary B-channels between the OGW and the TGW prior to the call entering into a connect state.

2. The method of claim 1 further comprising synchronizing the primary B-channel between the OGW and the TGW responsive to the receiving of the alerting message.

3. The method of claim 2 wherein synchronizing the secondary B-channels comprises a sequence of setup synchronization procedures for each of the secondary B-channels, the sequence commencing immediately following the synchronizing of the primary B-channel.

4. The method of claim 3 wherein the ISDN operates in accordance with H.320 protocol, and the synchronization procedures comprise H.221 synchronization procedures.

5. The method of claim 1 further comprising transmitting video media between the first and second IP video endpoints over the secondary B-channels substantially instantaneously after the call enters the connect state.

6. The method of claim 1 further comprising statically configuring corresponding call numbers for the secondary B-channels on the OGW.

7. The method of claim 1 wherein the alerting message includes a Progress Indicator (PI) number equal to eight.

8. The method of claim 1 wherein the first IP video endpoint is connected with the OGW over an IP network that operates in accordance with H.323.

9. The method of claim 1 wherein the first IP video endpoint is connected with the OGW over a network that operates in accordance with Session Initiation Protocol (SIP).

10. A non-transitory computer-readable storage medium encoded with a computer program, when executed, the computer program operable to:
    send a setup message from an originating gateway device (OGW) to a terminating gateway device (TGW) for a call on over a primary bearer channel (B-channel) of an Integrated Services Digital Network (ISDN);
    receive an alerting message sent from the TGW; and
    synchronize, without waiting for the call to enter a connect state, a plurality of bearer channels (B-channels) between the OGW and the TGW, the plurality of B-channels including the primary B-channel and multiple secondary B-channels, the multiple secondary B-channels for use in transmitting video data between the OGW and the TGW.

11. The non-transitory computer-readable storage medium of claim 10 wherein, when executed, the computer program is further operable to send Frame Alignment Signal (FAS) and Bit-Rate Allocation Signal (BAS) information between the OGW and the TGW for each of the plurality of B-channels.

12. The non-transitory computer-readable storage medium of claim 10 wherein the synchronization of the B-channels occurs in accordance with H.221 protocol.

13. The non-transitory computer-readable storage medium of claim 10 wherein the alerting message includes a Progress Indicator (PI) number equal to eight.

14. The non-transitory computer-readable storage medium of claim 13 wherein the OGW initiates synchronization of the primary B-channel followed by the multiple secondary B-channels in response to the alerting message.

15. The non-transitory computer-readable storage medium of claim 10 wherein, when executed, the computer program is further operable to receive call address information for each of the multiple secondary B-channels from the TGW.

16. The non-transitory computer-readable storage medium of claim 10 wherein the OGW is configured with call address information for each of the multiple secondary B-channels.

17. A system comprising:
    an originating gateway device (OGW) to connect with a first Internet Protocol (IP) video endpoint;
    a terminating gateway device (TGW) to connect with a second IP video endpoint, the OGW and the TGW being configured to establish a call between the first and second IP video endpoints via an Integrated Services Digital Network (ISDN), the OGW and the TGW being operable to synchronize, without waiting for the call to enter a connect state, a plurality of bearer channels (B-channels) between the OGW and the TGW, the plurality of B-channels including the primary B-channel and multiple secondary B-channels, the multiple secondary B-channels for use in transmitting video data between the OGW and the TGW.

18. The system of claim 17 wherein the synchronization of each one of the plurality of B-channels occurs in accordance with H.221 protocol.

19. The system of claim 17 wherein communications between the first IP video endpoint and the OGW, and between the second IP video endpoint the TGW, occur in accordance with H.323 protocol.

20. The system of claim 17 wherein the OGW is further operable to send a setup message to the TGW for setting up the call.

21. The system of claim 20 wherein the OGW is configured with call address information for each of the multiple secondary B-channels.

22. The system of claim 17 wherein the OGW is further operable to send a setup message to the TGW for setting up the call.

23. An apparatus comprising:
    an originating gateway (OGW) to connect with a first video endpoint over a first network using a first protocol suite, and also to connect with a terminating gateway (TGW) over an Integrated Services Digital Network (ISDN) using a second protocol suite, the TGW for connection with a second video endpoint, the OGW including:
    one or more processors; and
    a memory comprising one or more instructions executable at the processors, the processors operable when executing the instructions to:

send a setup message to the TGW for setting up a call on a primary bearer channel (B-channel); and initiate synchronization procedures, in response to an alerting message received from the TGW, to synchronize a plurality of bearer channels (B-channels) between the OGW and the TGW, the plurality of B-channels including the primary B-channel and multiple secondary B-channels, the multiple secondary B-channels for use in transmitting video data between the OGW and the TGW, wherein synchronization of the multiple secondary B-channels proceeds without waiting for the call to enter a connect state.

24. The apparatus of claim 23 wherein the memory is configured with call address information utilized for each of the multiple secondary B-channels.

* * * * *